(12) United States Patent
Kim (10) Patent No.: US 9,520,760 B2
(45) Date of Patent: Dec. 13, 2016

(54) ROTOR, INDUCTION MOTOR HAVING THE SAME, AND METHOD FOR MANUFACTURING THE SAME

(71) Applicant: HYUNDAI MOBIS CO., LTD., Seoul (KR)

(72) Inventor: Sang-Jin Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 207 days.

(21) Appl. No.: 14/494,341

(22) Filed: Sep. 23, 2014

(65) Prior Publication Data

US 2015/0188397 A1    Jul. 2, 2015

(30) Foreign Application Priority Data

Dec. 30, 2013  (KR) .................... 10-2013-0166831

(51) Int. Cl.
*H02K 17/20* (2006.01)
*H02K 15/02* (2006.01)
*H02K 15/00* (2006.01)
*H02K 3/02* (2006.01)

(52) U.S. Cl.
CPC ........ *H02K 15/0012* (2013.01); *H02K 17/205* (2013.01); *H02K 3/02* (2013.01); *Y10T 29/49012* (2015.01)

(58) Field of Classification Search
CPC ...... H02K 17/16; H02K 17/165; H02K 17/18; H02K 17/185
USPC ................................................. 310/211, 212
See application file for complete search history.

(56) References Cited

U.S. PATENT DOCUMENTS

| 2012/0126656 A1* | 5/2012 | Gerard | ............... H02K 15/0012 310/211 |
| 2013/0020899 A1* | 1/2013 | Kleber | ............... H02K 15/0012 310/211 |

FOREIGN PATENT DOCUMENTS

| KR | 20-1999-0014768 U | 5/1999 |
| KR | 10-2009-0007050 A | 1/2009 |
| KR | 10-2010-0087865 A | 8/2010 |

* cited by examiner

*Primary Examiner* — Thomas Truong
(74) *Attorney, Agent, or Firm* — Knobbe Martens Olson & Bear LLP (57) ABSTRACT

A rotor includes a stacked core having a plurality of slots formed on an inner side thereof, a plurality of rotor bars inserted in the plurality of slots, a pair of end rings assembled and fastened to opposite ends of the rotor bars, a pair of retainers fastened to opposite outer end surfaces of the rotor bars in an assembled and fastened manner, and a shaft inserted into the pair of end rings.

15 Claims, 8 Drawing Sheets

ROTOR, INDUCTION MOTOR HAVING THE SAME, AND METHOD FOR MANUFACTURING THE SAME

CROSS-REFERENCE TO RELATED APPLICATION

This application claims the benefit of priority to Korean Patent Application No. 10-2013-0166831, filed on Dec. 30, 2013, the entire contents of which are incorporated herein by reference.

TECHNICAL FIELD

The present disclosure relates to a rotor; and, particularly, to an assembly structure of rotor bars and end rings of an induction motor.

In addition, the present disclosure relates to an induction motor to which an assembly structure of rotor bars and end rings is applied.

Furthermore, the present disclosure relates to a method for manufacturing an assembly structure of rotor bars and end rings.

BACKGROUND

A rotor of an induction motor includes an electrical steel sheet, rotor bars, and end rings. The rotor bars are typically made of copper. In this case, after the copper rotor bars are manufactured to fit a shape of the electrical steel sheet and are inserted therein, upper and lower parts of the copper rotor bars are respectively connected to parts of the end rings through welding.

SUMMARY

An aspect of the present inventive concept relates to a rotor, an induction motor having the same, and a method for manufacturing the same, in which material strength of rotor bars and end rings is prevented from being decreased by high heat during welding.

Another aspect of the present inventive concept relates to a rotor, an induction motor having the same, and a method for manufacturing the same, in which a bonding part is prevented from being weakened due to stress concentration generated at a welding part during welding.

Another aspect of the present inventive concept relates to a rotor, an induction motor having the same, and a method for manufacturing the same, in which it is prevented that a welding part has a reduced bonding area or pores caused by gas for welding during welding.

Other aspects and advantages of the present inventive concept can be understood by the following description, and become apparent with reference to the embodiments of the present inventive concept. Also, it is obvious to those skilled in the art to which the present inventive concept pertains that the aspects and advantages of the present inventive concept can be realized by the means as claimed and combinations thereof.

An aspect of the present inventive concept provides a rotor in which material strength of rotor bars and end rings is prevented from being decreased by high heat during welding.

In accordance with an aspect of the present inventive concept, a rotor includes a stacked core having a plurality of slots formed on an inner side thereof, a plurality of rotor bars inserted in the plurality of slots, a pair of end rings assembled and fastened to opposite ends of the rotor bars, a pair of retainers fastened to opposite outer end surfaces of the rotor bars in an assembled and fastened manner, and a shaft inserted into the pair of end rings.

In this case, the assembled and fastened manner may be a threaded assembly manner.

In addition, a threaded shape may be formed on each of the opposite outer end surfaces of the plurality of rotor bars and inner surfaces of the pair of retainers.

In addition, each of the opposite outer end surfaces of the plurality of rotor bars may have a slope inclined at a certain angle from the outside to the inside.

In addition, each inner surface of the retainers may have a slope inclined at a certain angle from the inside to the outside.

In addition, the threaded shape may be a tapered female thread or a tapered male thread.

In addition, the plurality of rotor bars or the pair of end rings may be made of a copper (Cu) or aluminum (Al) material.

In addition, the plurality of rotor bars may be fully pressed against grooves of each of the end rings.

In accordance with another aspect of the present inventive concept, an induction motor includes the rotor provided above, and a stator surrounding the rotor.

In accordance with another aspect of the present inventive concept, a method for manufacturing a rotor, includes inserting a plurality of rotor bars in slots of a stacked core, assembling and fastening a pair of end rings to opposite ends of the plurality of rotor bars so as to be aligned with each other, forming a threaded shape on each of opposite outer end surfaces of the plurality of rotor bars, assembling a pair of retainers on the opposite outer end surfaces of the plurality of rotor bars, and inserting a shaft into the pair of end rings.

DETAILED DESCRIPTION

Embodiments of the present inventive concept will be described below in more detail with reference to the accompanying drawings. The present inventive concept may, however, be embodied in different forms and should not be construed as limited to the embodiments set forth herein. Rather, these embodiments are provided so that this disclosure will be thorough and complete, and will fully convey the scope of the present inventive concept to those skilled in the art. Therefore, it should be understood that the scope and spirit of the present inventive concept can be extended to all variations, equivalents, and replacements in addition to the appended drawings of the present inventive concept.

Throughout the disclosure, like reference numerals refer to like parts throughout the various figures and embodiments of the present inventive concept.

Furthermore, the terms including expressions, such as first and/or second, used in the specification of the present inventive concept may be used to describe various elements of the present inventive concept. However, the elements of the present inventive concept should not be limited by the terms used in the specification of the present inventive concept. In other words, such terms will be used only to differentiate one element from other elements of the present inventive concept.

For example, without deviating from the scope and spirit of the present inventive concept, a first element may be referred to as a second element, and, similarly, a second element may also be referred to as a first element. As used herein, the term "and/or" includes any and all combinations of one or more of the associated listed items.

Unless otherwise defined, all terms, including technical and scientific terms, used herein have the same meaning as commonly understood by one of ordinary skill in the art.

It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a rotor, an induction motor having the same, and a method for manufacturing the same according to an embodiment of the present inventive concept, will be described below in more detail with reference to the accompanying drawings.

Figure 1A:
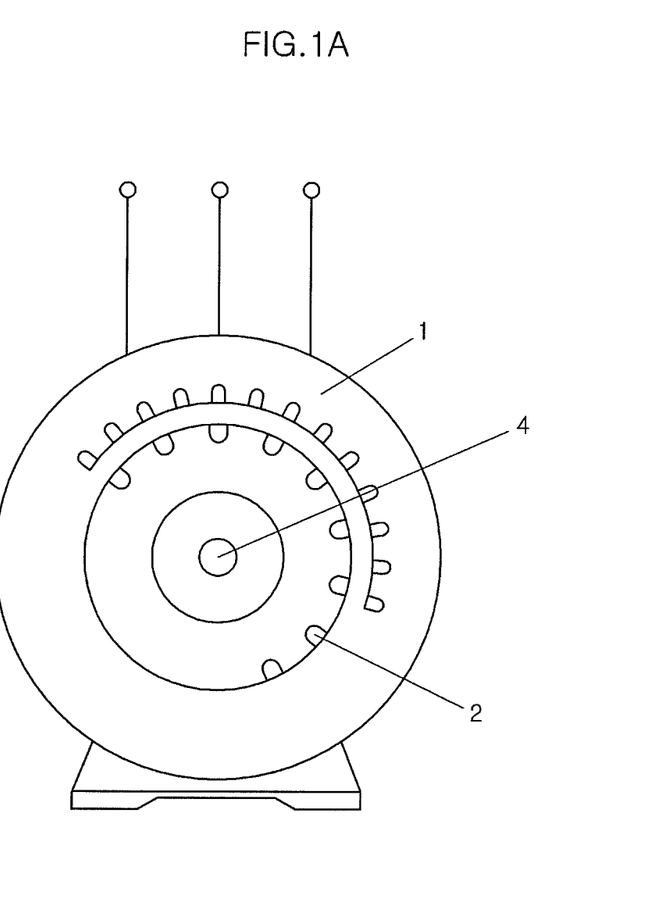
FIGS. 1A and 1B are conceptual views illustrating a structure of a typical induction motor.
Figure 1B:
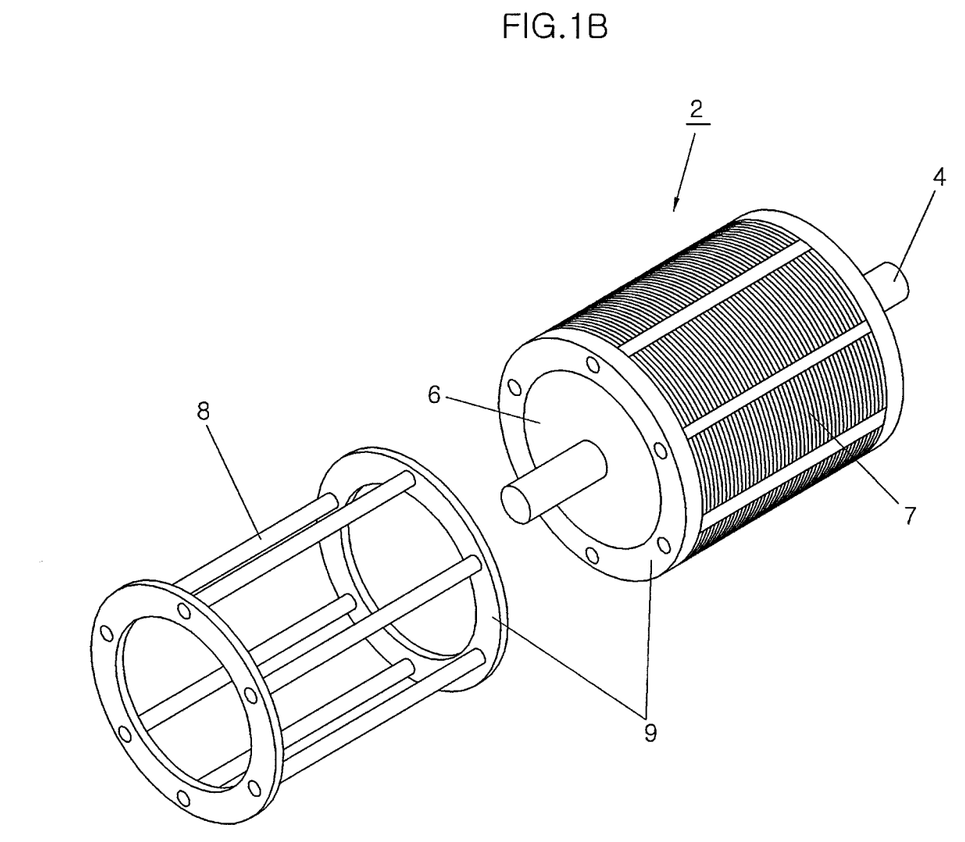

An example of a method of connecting the copper rotor bars to the end rings is attained by forming the end rings in a doughnut shape. This structure is shown in FIGS. 1A and 1B. Referring to FIG. 1A, the induction motor includes a stator 1, a rotor 2, and a rotary shaft 4.

Referring to FIG. 1B, the rotor 2 includes a rotor core 6 and a rotor winding 7, and the rotor winding 7 includes rotor bars 8 and end rings 9 welded to opposite ends of the rotor bars. In this case, the rotor bars 8 are each formed in a bar shape and are then bonded to the end rings 9 by welding.

In the foregoing example, since material strength of the rotor bars and end rings is decreased by high heat during welding, the rotor bars and the end rings may be destroyed during high rotation thereof.

In addition, since bonding weakness is caused due to stress concentration generated at welding parts, the rotor bars and the end rings may be destroyed during high rotation thereof.

In addition, since the welding parts have reduced bonding areas or pores caused by gas for welding, electrical resistance may be increased. Accordingly, efficiency and performance of a motor may be deteriorated.

Furthermore, the welding structure may require many processes. In other words, the welding structure requires nine step processes such as (1) a process of inserting the rotor bars in core slots, (2) a process of aligning the rotor bars with the end rings, (3) a process of inserting silver-copper sheets between the rotor bars and the end rings, (4) a process of injecting a flux between the rotor bars and the end rings, (5) a process of brazing and welding the rotor bars and the end rings, (6) a process of quenching the rotor bars and the end rings, (7) a process of processing the end rings, (8) a process of shrink fitting retainers, and (9) a process of assembling a shaft.

Figure 2:
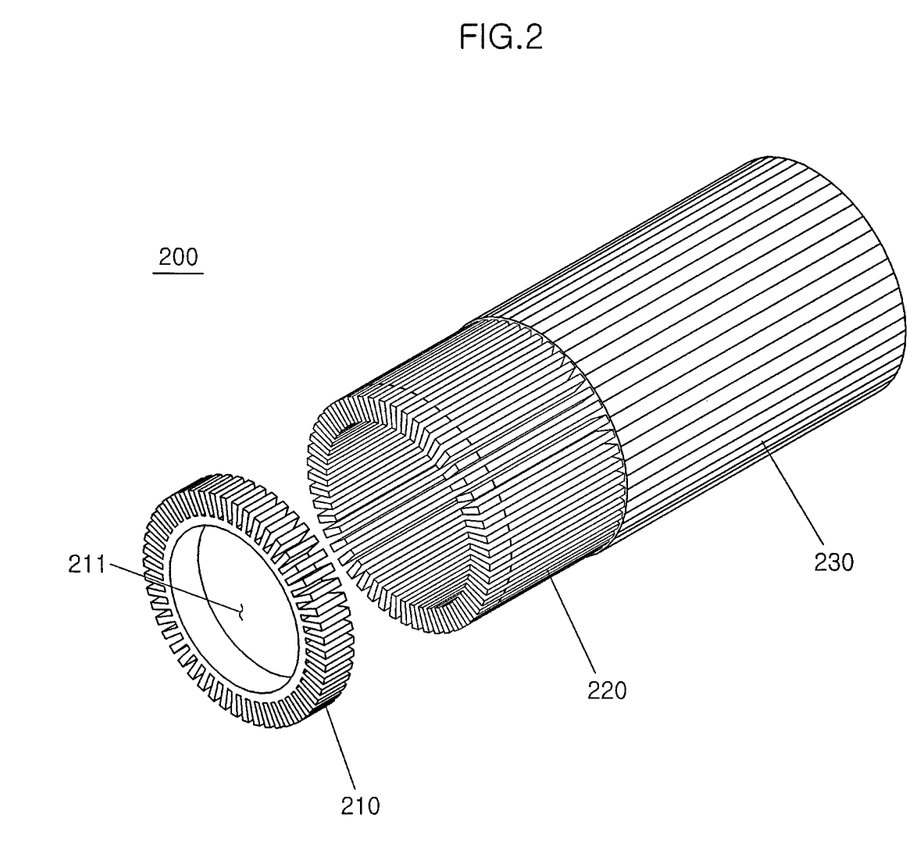
FIG. 2 is an assembled perspective view of a rotor including end rings, rotor bars, and a stacked core, only one end ring being illustrated in FIG. 2.

FIG. 2 shows an assembled perspective view of a rotor 200 according to an embodiment, the rotor 200 including end rings 210, rotor bars 220, and a stacked core 230, only one end ring being illustrated in FIG. 2. Referring to FIG. 2, a plurality of rotor bars 220 are inserted in a plurality of slots formed on an inner side of the stacked core 230. In other words, each of the rotor bars is inserted in a slot and an adjacent slot in the stacked core 230.

When the plurality of rotor bars 220 are inserted in the plurality of slots, the end rings 210 are inserted into the opposite ends of the rotor bars, respectively. Each of the end rings 210 has a single-shaped circular band formed on an inner side thereof and a plurality of "⊏"-shaped or "C"-shaped segments are formed on the circular band. Accordingly, the rotor bars 220 are fixedly inserted into the "⊏"-shaped segments, respectively.

The plurality of rotor bars 220 and/or the end rings 210 are each made of a copper (Cu) or aluminum (Al) material. When the rotor bars and the end rings are made of an aluminum material, the rotor bars and the end rings are simultaneously manufactured so as to be integrally formed through aluminum die casting. Of course, instead of aluminum, copper having low resistivity may also be used to improve efficiency of an induction motor.

Figure 3:
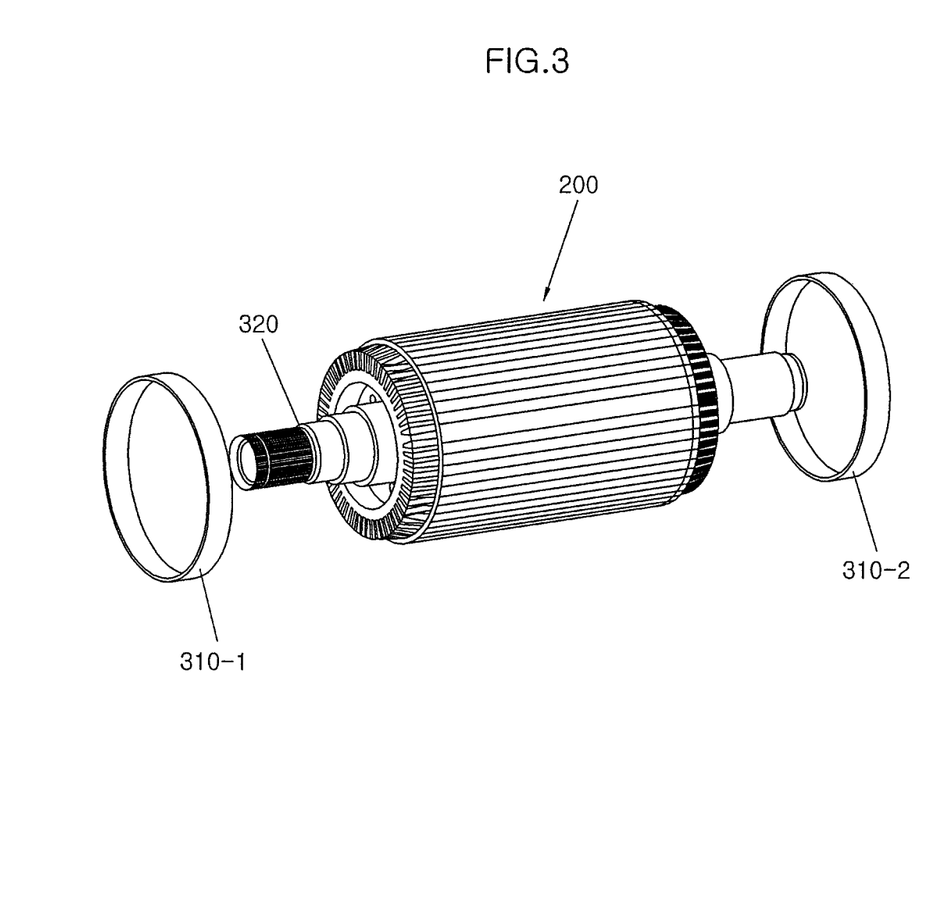
FIG. 3 is a conceptual view illustrating assembly of retainers to opposite ends of the assembled rotor of FIG. 2.

FIG. 3 is a conceptual view illustrating assembly of retainers 310-1 and 310-2 to opposite ends of the assembled rotor 200 of FIG. 2. Referring to FIG. 3, after the end rings 210 shown in FIG. 2 are assembled to the plurality of the rotor bars 220, a shaft 320 is inserted into hollows 211 of the end rings 210.

In the inserted state of the shaft 320, both retainers 310-1 and 310-2 are fastened and assembled to the ends of the plurality of rotor bars 220. In other words, a first retainer 310-1 is inserted to left ends of the rotor bars 220 to be assembled and fastened thereto and a second retainer 310-2 is inserted to right ends of the rotor bars 220 to be assembled and fastened thereto.

Figure 4:
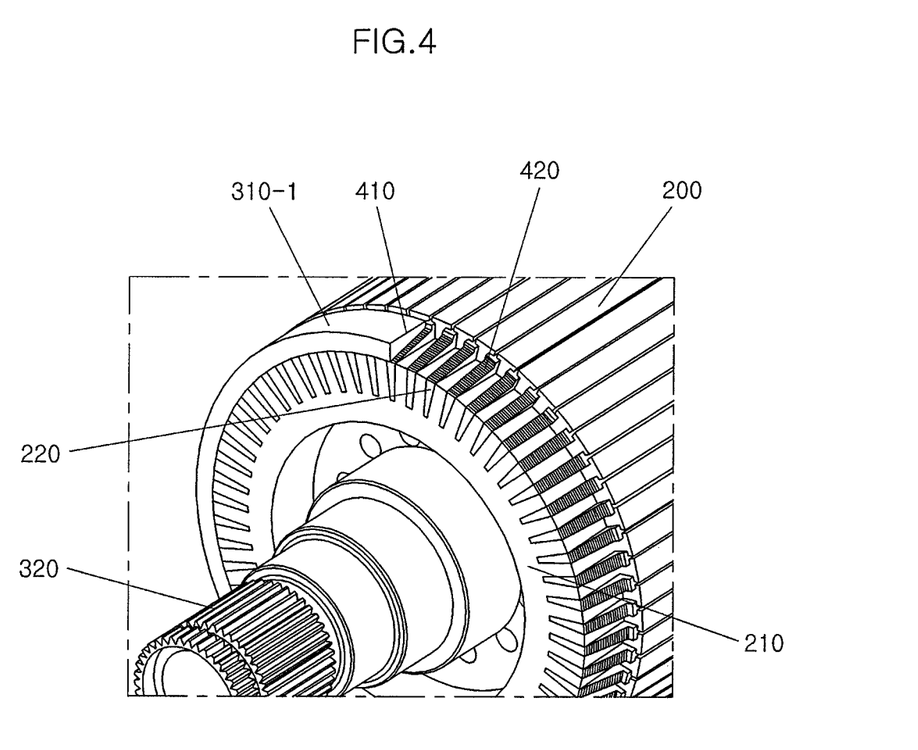
FIG. 4 is a partially cut and enlarged conceptual view illustrating a coupling structure of the rotor bars and one retainer in the assembled rotor of FIG. 3.

FIG. 4 is a partially cut and enlarged conceptual view illustrating a coupling structure of the rotor bars and one retainer in the assembled rotor 200 of FIG. 3. Referring to FIG. 4, the first retainer 310-1 is assembled and fastened to the rotor bars 220 in a threaded assembly manner. To this end, a threaded shape 420 is formed on an outer end surface of each rotor bar 220.

Of course, a threaded shape, which alternately engages with the threaded shape 420 formed on the outer end surface of the rotor bar 220, is also formed on an inner surface of the first retainer 310-1. For example, a tapered male thread may be formed on the outer end surface of the rotor bar 220 and a tapered female thread may be formed on the inner surface of the first retainer 310-1.

Of course, on the contrary, a tapered female thread may also be formed on the outer end surface of the rotor bar 220 and a tapered male thread may also be formed on the inner surface of the first retainer 310-1.

In addition, the outer end surface of the rotor bar 220 has a slope inclined at a certain angle from the outside to the inside. On the contrary, the inner surface of the first retainer 310-1 has a slope inclined at a certain angle from the inside to the outside. That is, an inclined surface of the rotor bar comes into contact with and matches with an inclined surface of the first retainer.

Although FIG. 4 shows only the left portion of the coupling structure, the right portion thereof is similarly applied.

Figure 5:
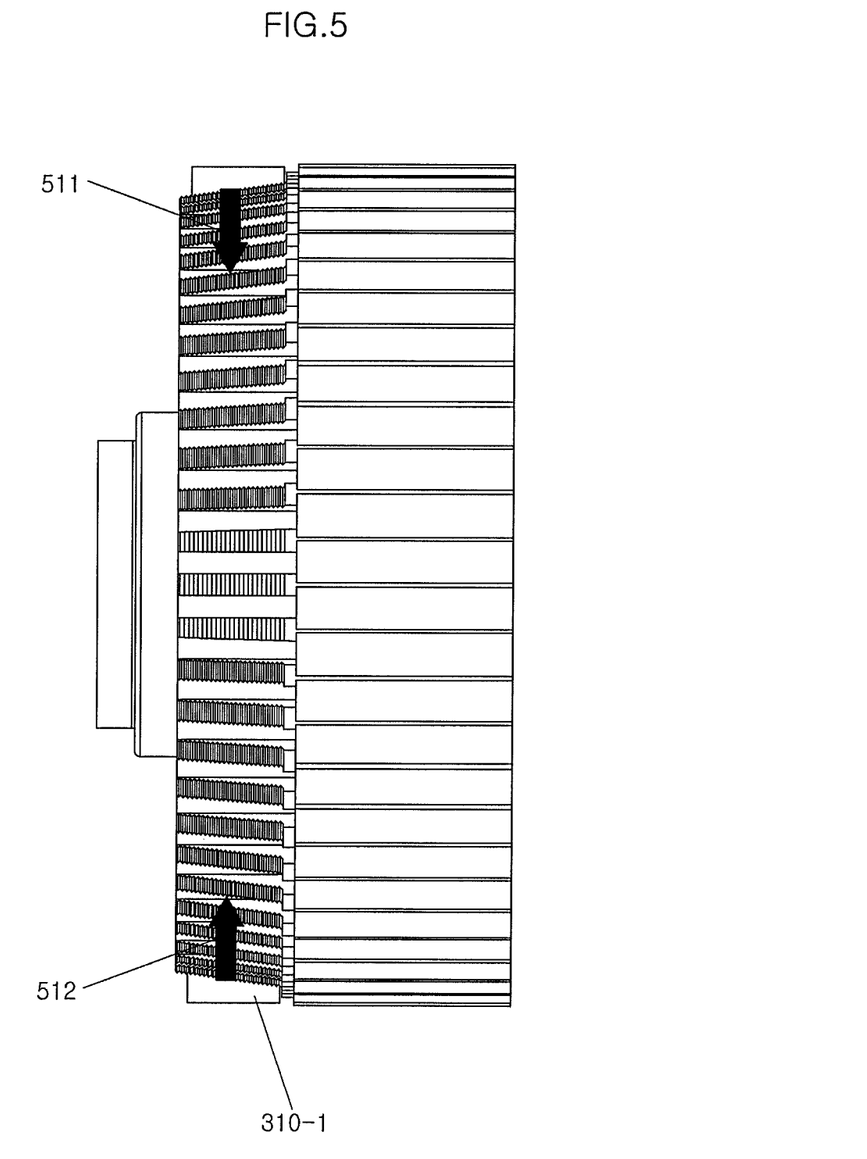
FIG. 5 is a conceptual view illustrating a state in which the rotor bars are inwardly subjected to forces so that the retainer is fully pressed against grooves of the end ring according to an embodiment of the present inventive concept.

FIG. 5 is a conceptual view illustrating a state in which the rotor bars are inwardly subjected to forces so that the retainer is fully pressed against grooves of the end ring according to an embodiment of the present inventive concept. Referring to FIG. 5, the plurality of rotor bars 220 are inwardly subjected to forces 511 and 512 by the tapered thread of the first retainer 310-1. Accordingly, the first retainer 310-1 is fully pressed against grooves of the associated end ring.

Figure 6:
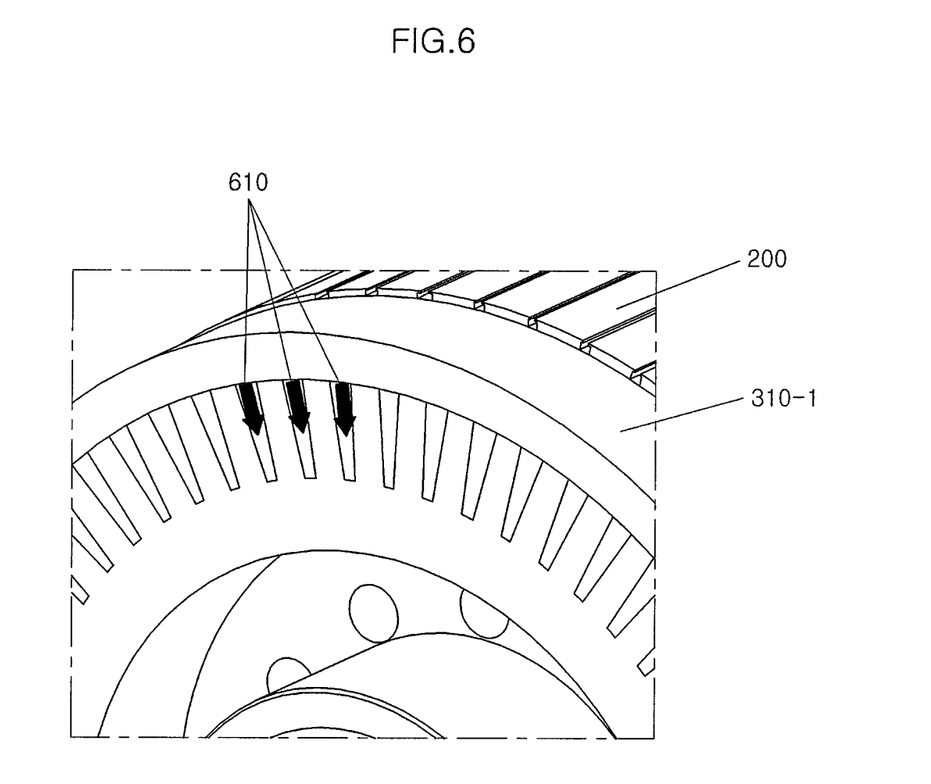
FIG. 6 is a conceptual view illustrating a state in which the rotor bars are inwardly subjected to forces so that the retainer is fully pressed against grooves of the end ring according to the embodiment of the present inventive concept.

FIG. 6 is a conceptual view illustrating a state in which the rotor bars are inwardly subjected to forces so that the retainer is fully pressed against grooves of the end ring according to the embodiment of the present inventive concept. Referring to FIG. 6, the plurality of rotor bars 220 are inwardly subjected to forces 610 by the tapered thread of the first retainer 310-1 to be fully pressed against grooves of the associated end ring.

The rotor 200 of FIGS. 2 to 6 is applied to the induction motor including a stator (not shown) surrounding the rotor 200.

Figure 7:
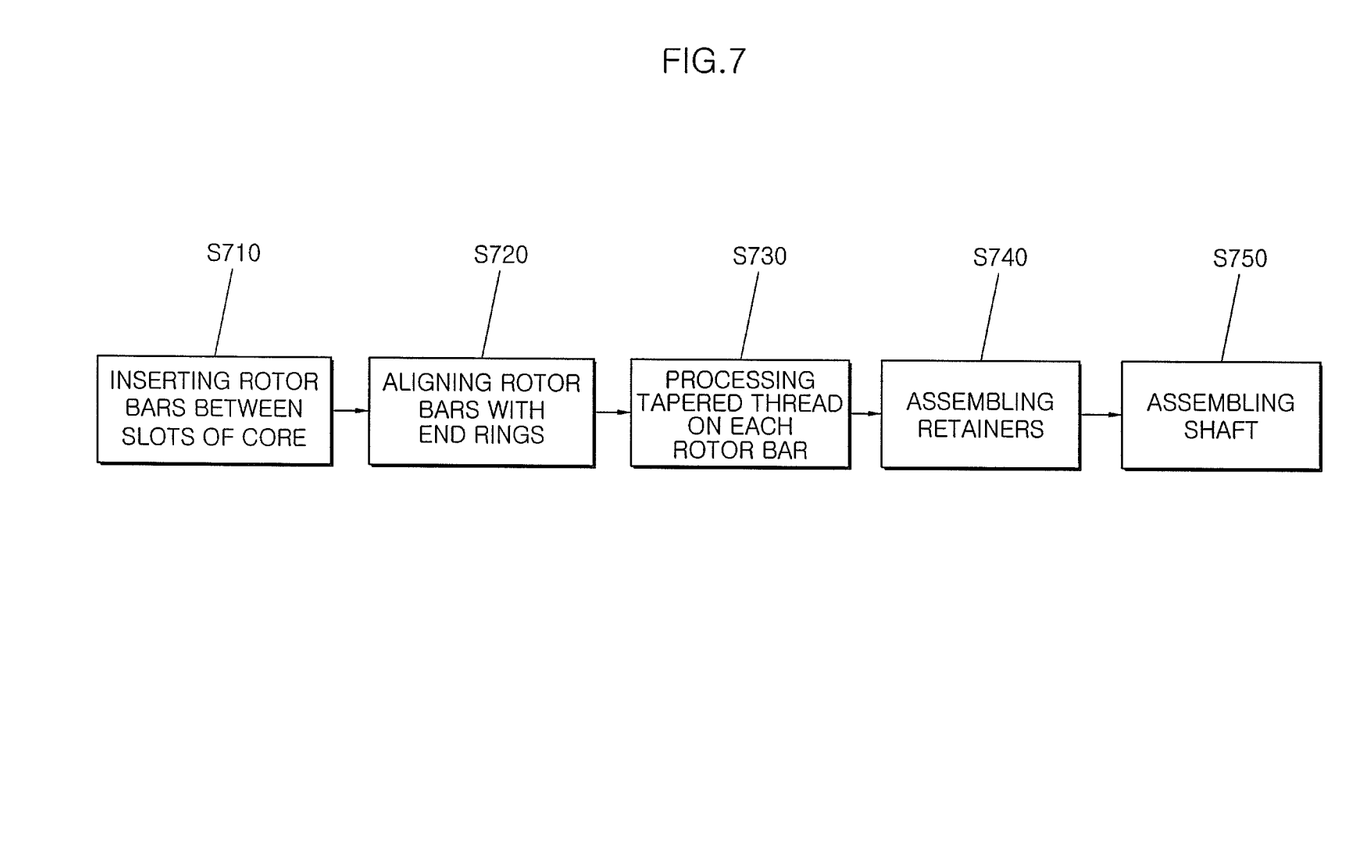
FIG. 7 a flowchart illustrating a process of assembling the retainer to the rotor bars according to the embodiment of the present inventive concept.

FIG. 7 a flowchart illustrating a process of assembling the retainer to the rotor bars according to the embodiment of the present inventive concept. Referring to FIG. 7, the plurality of rotor bars 220 (see FIG. 2) are inserted in the slots of the stacked core 230 (see FIG. 2) (step S710).

When the insertion of the plurality of rotor bars 220 is completed, the pair of end rings are assembled and fastened to the opposite ends of the plurality of rotor bars so as to be aligned therewith (step S720).

Next, the threaded shapes are respectively formed on the outer surfaces of the opposite ends of the plurality of rotor bars (step S730). In other words, the threaded shape is formed on a portion of the end of each rotor bar through tapered thread processing.

When the threaded shapes are formed on the rotor bars, the pair of retainers are assembled to the opposite ends of the rotor bars (step S740). Of course, prior to the above assembly, the threaded shapes are respectively formed on the pair of retainers through tapered thread processing.

The shaft is inserted into the hollows 211 of the pair of end rings 210 (see FIG. 2) so that the assembly of the rotor 200 is completed (step S750).

In accordance with the embodiments of the present inventive concept, since retainers are each formed with a tapered female thread and rotor bars are each formed with a tapered male thread so that the retainers and the rotor bars are fully fastened by threaded coupling, a welding process is not required during assembly of the rotor bars and end rings.

In addition, the present inventive concept has an advantage of reducing the number of assembly processes by elimination of the welding process.

In addition, the present inventive concept has an advantage of preventing material strength of the rotor bars and end rings from being decreased by high heat during welding since the welding process is not required.

In addition, the present inventive concept has an advantage of preventing a bonding part from being weakened due to stress concentration generated at a welding part during welding since the welding process is eliminated.

Furthermore, the present inventive concept has an advantage of preventing the welding part from having a reduced bonding area or pores caused by gas for welding during welding since the welding process is eliminated.

While the present inventive concept has been described with respect to the specific embodiments, it will be apparent to those skilled in the art that various changes and modifications may be made without departing from the spirit and scope of the invention as defined in the following claims.

What is claimed is:

1. A rotor comprising:
   a magnetic core comprising a body having a first end and a second end along a rotor axis, the body comprising a plurality of slots elongated along the rotor axis;
   a plurality of rotor bars, each comprising a middle portion inserted in one of the plurality of slots and a first end portion that extends out of its corresponding slot from the first end of the body in a first direction away from the second end such that the first end portions of the plurality of rotor bars protrude from the first end of the body and are arranged around the rotor axis with a first end portion gap between two first end portions that are immediately neighboring from each other, each first end portion comprising a radially outwardly facing surface, wherein the radially outwardly facing surfaces of the first end portions in combination provide threads;
   a first end ring comprising a plurality of radially arranged teeth with a first end ring gap between two immediately neighboring teeth, the first end ring engaged with the first end portions of the plurality of rotor bars such that each tooth of the first end ring is inserted in one of the first end portion gaps and each first end portion is inserted in one of the first end ring gaps; and
   a first retainer comprising an inner circumference that is threaded,
   wherein the threads provided by the radially outwardly facing surfaces of the first end portions are engaged with the threaded inner circumference of the first retainer,
   wherein each radially outwardly facing surface has a slope inclined with respect to the rotor axis, wherein each radially outwardly facing surface is raised in a radial direction relative to the tooth immediately adjacent thereto.

2. The rotor of claim 1, wherein each of the plurality of rotor bars comprises a second end portion that extends out of its corresponding slot from the second end of the body in a second direction away from the first end such that the second end portions of the plurality of rotor bars protrude from the second end of the body and are arranged around the rotor axis with a second end portion gap between two second end portions that are immediately neighboring from each other, wherein each second end portion comprises a radially outwardly facing surface that is threaded.

3. The rotor of claim 2, further comprising
   a second end ring comprising a plurality of radially arranged teeth with a second end ring gap between two immediately neighboring teeth, the second end ring engaged with the second end portions of the plurality of rotor bars such that each tooth of the second end ring is inserted in one of the second end portion gaps and each second end portion is inserted in one of the second end ring gaps; and
   a second retainer comprising an inner circumference that is threaded,
   wherein the radially outwardly facing surfaces of the second end portions in combination provide threads configured to engage with the inner circumference of the second retainer.

4. The rotor of claim 1, wherein the inner circumference of the first retainer has a slope inclined with respect to the rotor axis, wherein the first retainer is not welded to the first end portions.

5. The rotor of claim 1, wherein the threads provided by the radially outwardly facing surfaces comprise a tapered female thread or a tapered male thread.

6. The rotor of claim 1, wherein the plurality of rotor bars are made of a copper (Cu) or aluminum (Al) material.

7. The rotor of claim 1, wherein the first retainer is in a ring shape.

8. An induction motor comprising:
the rotor of claim 1; and
a stator surrounding the rotor, wherein the first retainer is not welded to the first end portions.

9. A method for manufacturing a rotor, comprising:
providing a magnetic core comprising a body having a first end and a second end, the body comprising a plurality of slots elongated along a rotor axis;
providing a plurality of rotor bars that comprises a middle portion and a first end portion
providing a first end ring comprising a plurality of radially arranged teeth with a first end ring gap between two immediately neighboring teeth
providing a first retainer comprising an inner circumference that is threaded;
inserting each rotor bar such that the middle portion inserted in one of the plurality of slots and the first end portion extending out of its corresponding slot from the first end of the body in a first direction away from the second end and further such that the first end portions of the plurality of rotor bars protrude from the first end of the body and are arranged around the rotor axis with a first end portion gap between two first end portions that are immediately neighboring from each other, each first end portion comprising a radially outwardly facing surface, wherein the radially outwardly facing surfaces of the first end portions in combination provide threads;
engaging the first end ring with the first end portions of the plurality of rotor bars such that each tooth of the first end ring is inserted in one of the first end portion gaps and each first end portion is inserted in one of the first end ring gaps; and
engaging the threaded inner circumference of the first retainer with the threads provided by the radially outwardly facing surfaces,
wherein each outwardly facing surface has a slope inclined with respect to the rotor axis, wherein each radially outwardly facing surface is raised in a radial direction relative to the tooth immediately adjacent thereto.

10. The method of claim 9, wherein upon inserting, each of the plurality of rotor bars further comprises a second end portion that extends out of its corresponding slot from the second end of the body in a second direction away from the first end such that the second end portions of the plurality of rotor bars protrude from the second end of the body and are arranged around the rotor axis with a second end portion gap between two second end portions that are immediately neighboring from each other, wherein each second end portion comprises a radially outwardly facing surface that is threaded.

11. The method of claim 10, wherein threads of the inner circumference of the first retainer comprise a tapered female thread or a tapered male thread.

12. The method of claim 9, wherein the threads provided by the radially outwardly facing surfaces comprise a tapered female thread or a tapered male thread.

13. The method of claim 9, wherein the inner circumference of the first retainer has a slope inclined with respect to the rotor axis, wherein the first retainer is not welded to the first end portions in the resulting rotor.

14. The method of claim 9, wherein the first retainer is in a ring shape.

15. A method of making a motor, comprising:
manufacturing the rotor according to claim 9, wherein the first retainer is not welded to the first end portions in the resulting rotor; and
arranging the rotor relative to the stator such that the stator surrounds the rotor.

* * * * *